United States Patent [19]

Mueller

[11] Patent Number: 4,691,593

[45] Date of Patent: Sep. 8, 1987

[54] LIMITED SLIP DIFFERENTIAL SYSTEM FOR A MOTOR VEHICLE WITH ALL-WHEEL DRIVE

[75] Inventor: Robert Mueller, Moensheim, Fed. Rep. of Germany

[73] Assignee: Dr. Ing. h.c.F. Porsche Aktiengesellschaft, Fed. Rep. of Germany

[21] Appl. No.: 835,381

[22] Filed: Mar. 3, 1986

[30] Foreign Application Priority Data

Mar. 2, 1985 [DE] Fed. Rep. of Germany ....... 3507490

[51] Int. Cl.⁴ ............................ F16H 1/42; F16H 1/28
[52] U.S. Cl. ........................................ 74/714; 74/802; 74/705; 180/249
[58] Field of Search ................. 74/705, 802, 695, 714; 180/248, 249

[56] References Cited

U.S. PATENT DOCUMENTS

| | | | |
|---|---|---|---|
| 3,269,217 | 8/1966 | Holtom | 74/705 |
| 3,709,314 | 1/1973 | Hickey | 180/249 |
| 3,792,628 | 2/1974 | Stieg | 74/714 |
| 3,828,877 | 8/1974 | Fogelberg | 180/249 |
| 4,428,452 | 1/1984 | Muraoka et al. | 180/249 |
| 4,520,691 | 6/1985 | Rodler, Jr. | 74/802 X |
| 4,541,503 | 9/1985 | Akufagawa et al. | 180/249 |
| 4,567,788 | 2/1986 | Miller | 74/802 X |

FOREIGN PATENT DOCUMENTS

| | | | |
|---|---|---|---|
| 811650 | 7/1949 | Fed. Rep. of Germany | 74/714 |
| 3218830 | 5/1982 | Fed. Rep. of Germany | . |
| 800230 | 12/1955 | United Kingdom | 74/714 |

Primary Examiner—Leslie Braun
Assistant Examiner—D. Wright

[57] ABSTRACT

A limited slip differential system in the drive train of a motor vehicle with continuous all-wheel drive is provided with a direct through drive acted on by an intermediate planetary transmission and an engageable braking device. The transmission ratio between the planetary transmission and the braking device is substantially higher than the transmission ratio for the direct through drive. This keeps the required braking moment small and allows the use of a relatively small braking device.

16 Claims, 5 Drawing Figures

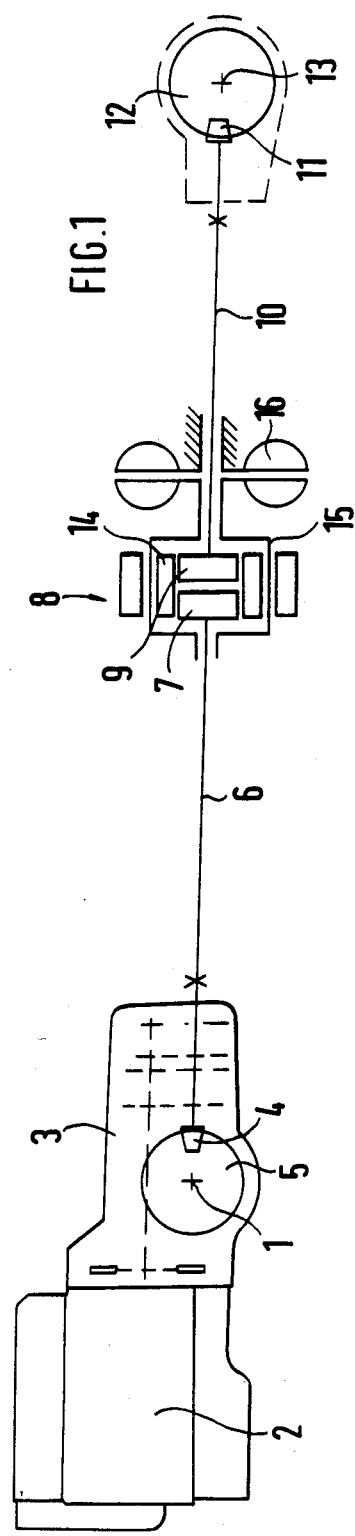
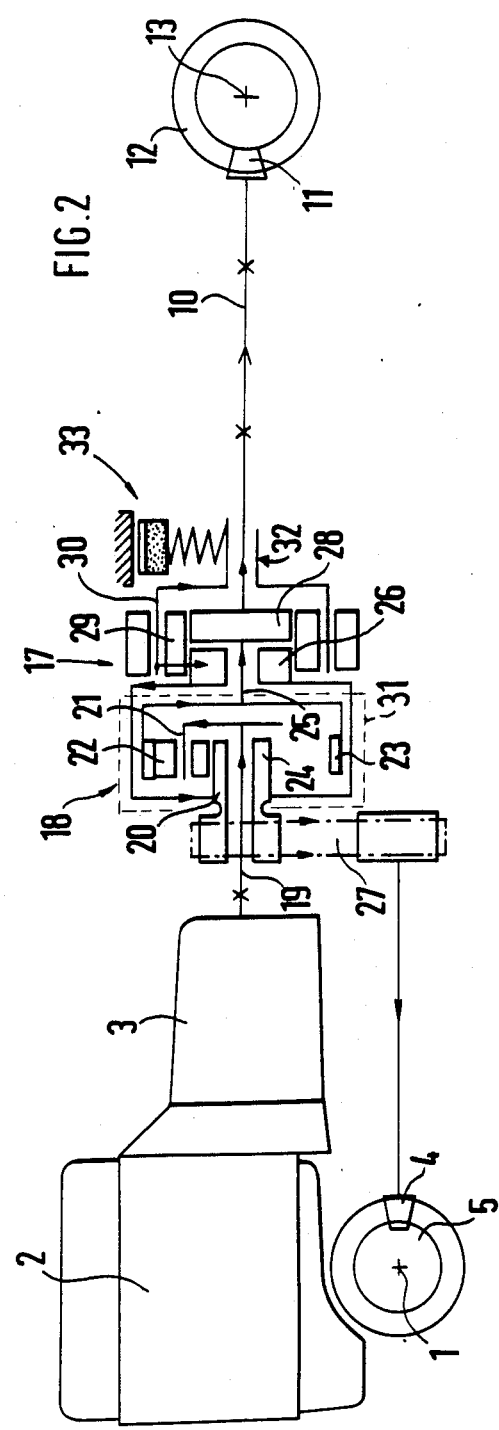

LIMITED SLIP DIFFERENTIAL SYSTEM FOR A MOTOR VEHICLE WITH ALL-WHEEL DRIVE

BACKGROUND AND SUMMARY OF THE INVENTION

The invention relates to a limited slip differential system for the drive train of a motor vehicle with continuous all-wheel drive, having an intermediate planetary transmission in the direct through drive and a corresponding braking means engageable with the intermediate planetary transmission in response to the rotational speed difference between the front and rear axles of the motor vehicle.

An all-wheel drive is described in German Published Unexamined Application No.(DE-OS) 32 18 830, in which a transfer transmission constructed as a planetary transmission is connected behind a speed change transmission for distributing the driving load between the front axle and the rear axle of the motor vehicle. A drive branch of the planetary gear transmission includes a switchable clutch and a switchable brake which selectively connect a driving branch to the transmission housing. The gear ratio of the planetary transmission is chosen such that when one driving branch is disconnected by disengagement of the clutch and the application of the brake, the other driving branch will be driven with a transmission. In this system, under good road conditions, driving with a splitting of the entire transmission and quick gear shifting are both facilitated, while the front and rear axles can be driven when the clutch is engaged and the brake is disengaged.

An object of the present invention is to provide a limited slip differential system of the above-described type, which upon slipping of one of the axles, correspondingly limits the rotational speed difference with respect to the other axle. Therefore, synchronous running of both axles is facilitated, without requiring a high braking moment and a large volume brake.

This and other objects are attained by providing that a limited slip differential system of the above-described type has a substantially higher transmission ratio between the braking device and the planetary transmission than the transmission ratio for the direct through drive.

An especially preferred embodiment of the present invention provides that the gear ratio of the inlet sun gear wheel to the planetary carrier which is connected to a braking member of the braking device, is 16:1. Therefore, a resistance to the transfer of rotational speed of the driven shaft to the rear axle is created, which results in a rotational moment transfer to the rear axle. Due to the high gear ratio and the low associated toothed-gear wheel efficiency, the required braking moment is very small so that only a small volume hydrodynamic or centrifugal brake is needed.

An advantageous feature of a preferred embodiment of the present invention is the use of a brake with progressive braking moment to axle rotational speed difference characteristics. With this feature, the transfer moment for small slip values is also kept small. Thus, the vehicle exhibits good handling, and an ABS system will be fully functional. The transfer moment rises very steeply with large slip values, which can occur, for example, if the wheels of one axle are on ice and the wheels of the other axle are on grippable asphalt. The steep rise of the transfer moment in this situation allows problem-free driving.

Further objects, features, and advantages of the present invention will become more apparent from the following description when taken with the accompanying drawings which show, for purposes of illustration only, embodiments constructed in accordance with the present invention.

BRIEF DESCRIPTION OF THE DRAWINGS

FIG. 1 shows a limited slip differential system for an all-wheel drive constructed in accordance with a preferred embodiment of the present invention;

FIG. 2 shows an alternate preferred embodiment of a limited slip differential system for an all-wheel drive constructed in accordance with the present invention;

DETAILED DESCRIPTION OF THE DRAWINGS

Figure 1A:
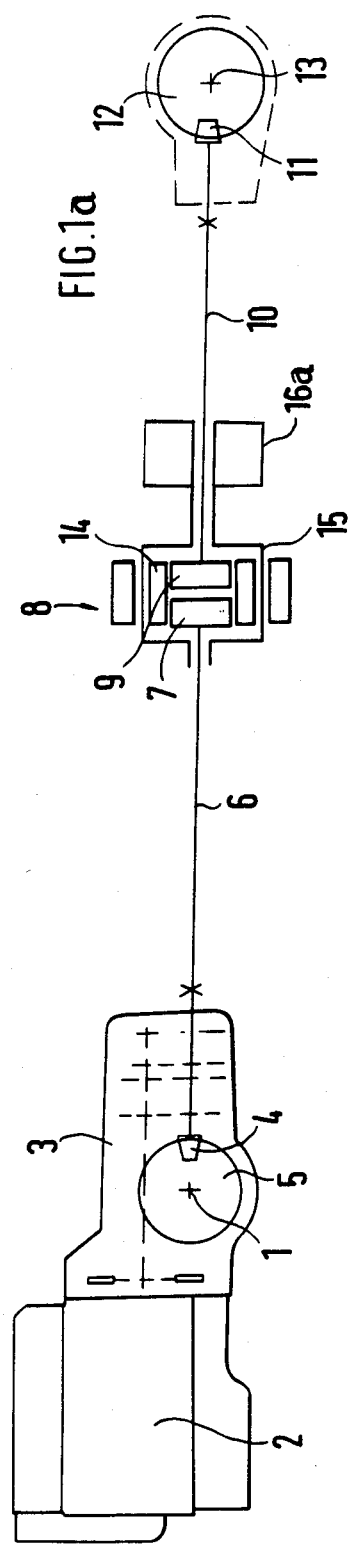
FIG. 1a is a system similar to the system of FIG. 1, having a schematically indicated brake.

A driving motor 2 of a motor vehicle, shown located in the area of the front axle 1 in FIG. 1, drives the front axle 1 through a gear shift transmission 3 by means of a bevel gear 4 and plate gear wheel 5. A driving shaft 6 extends from the bevel gear 4 to an inlet sun gear wheel 7 of a planetary transmission 8. Coaxial and adjacent to the inlet sun gear wheel 7 is an outlet sun gear wheel 9 which is drivingly connected to a driven shaft 10. A rear wheel axle 13 is drivingly connected to this driven shaft 10 by means of a bevel gear 11 engagable in a plate gear wheel 12 of the rear axle 13.

A planetary wheel 14 is engaged with the inlet sun gear wheel 7 and the outlet sun gear wheel 9. This planetary wheel 14 is fixed to a planetary carrier 15 which in turn is fixedly connected with the braking member of a hydrodynamic brake 16. In this preferred embodiment of the present invention, the inlet sun gear wheel 7 has a number of gear teeth $Z=32$ and the outlet sun gear wheel 9 has a number of gear teeth $Z=30$. In order to prevent the rear axle 13 from turning faster than the front axle 1, the ratio of the bevel gear/plate gear of the rear axle 13 in preferred embodiments is 8:32, while the corresponding ratio at the forward axle is 8:30. These ratios ensure that the through drive transmission ratio is fully compensated for by the respective bevel gear/plate gear combinations.

The gear ratio of the inlet sun gear wheel 7 to the planetary wheel 14 equals 16:1. Since this ratio is substantially higher than the transmission ratio for the direct through drive (which is approximately 1:1), the required braking moment will be small.

If the same drive train arrangement is used for a vehicle with a rear motor the auxiliary driven forward axle should be driven at a slightly higher rotational speed than the rear axle 13. This is already achieved since the through drive ratio of the planetary transmission to the front axle transmission is only partly compensated for. In the embodiment of the system of FIG. 1, but with the motor in the rear, this compensation is 50%. This provides a stationary planet carrier 15 while also providing a front axle drive with the front axle running up to 3.33% faster than the rear axle.

During straight driving, the braking element may exhibit at certain vehicle velocity dependent rotational speeds, a reduction in performance according to the characteristics of the braking element. Contemplated preferred embodiments provide that the braking moment at higher vehicle speeds be reduced by means of a vehicle speed dependent external brake or a centrifugal brake, or by switching off the front axle drive entirely by means of opening the brake.

In a further preferred embodiment of the present invention illustrated in FIG. 2, a transfer transmission or case 18 is connected in front of the direct through drive serving the planetary gear transmission 17. The transfer transmission 18 is constructed as a planetary transmission and allows a distribution of the driving moments to the front axle 1 and the rear axle 13 in a fixed relationship.

FIG. 1a shows a further preferred embodiment of the system with a schematically indicated brake 16a, instead of the hydrodynamic brake 16 of FIG. 1. This brake 16a is a self-actuating brake, such as a mechanical friction brake or centrifugal brake, in certain preferred embodiments. In other preferred embodiments, the brake 16a is an externally guided brake, such as a hydraulically operated Lamella brake, or electrical eddy current brake.

In FIG. 2, the movement path in the transmission arrangement is depicted by arrows. A driven shaft 19 extending from the gear shift transmission 3 is guided through a hollow shaft 20 of the transfer transmission 18 and drives a planetary carrier 21. Planet carrier 21 drives both a planet wheel 22 of hollow wheel 23, and a sun gear wheel 24 arranged on the hollow shaft 20. The driving of the sun gear wheel 24 drives the hollow shaft 20 which carries an engaging chain drive 27 for the front axle 1.

A central shaft 25 connected with the hollow wheel 23 is centrally guided through one sun gear wheel 26 of the planetary gear transmission 17 and is drivingly connected with a second sun gear wheel 28, which is parallel and adjacent to the sun gear wheel 26. The second sun gear wheel 28 is connected to the driving shaft for the rear axle 19. The sun gear wheel 28 drives the planet wheel 29 of a planet carrier 30 which engages with the sun gear wheel 26. An overlapping bell housing 31 fixes the sun gear wheel 26 at the hollow shaft 20. The bell housing 31 bypasses transfer transmission 18 and is itself fixed to the hollow shaft 20.

A centrifugal brake 33 operates on a central brake shaft 32 connected with the planet carrier 30. The details of a preferred embodiment of the brake 33 are more clearly shown in FIG. 4 and are described in the following paragraph. The sun gear wheel 26 has a number of teeth $Z=31$, and the sun gear wheel 28 a number of gear teeth $Z=32$. The bevel gear/plate gear axle transmission ratio for the front axle 1 equals 9:33, and for the rear axle is equal to 9:31 so that the through drive transmission is compensated by 50%.

Figure 4:
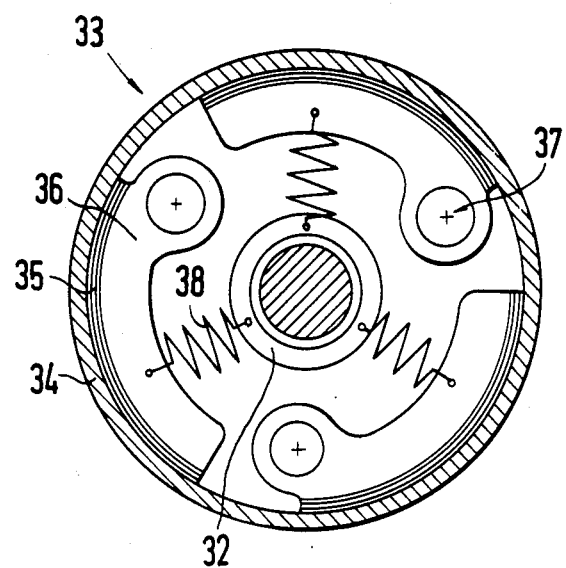
FIG. 4 is a cross section of a preferred embodiment of a centrifugal brake used in certain preferred embodiments of the present invention.

The embodiment of the centrifugal brake 33 illustrated in FIG. 4 has a fixed brake drum 34 at which three rotatable pivotably connected brake shoes 36 with braking surfaces 35 are pressed radially outward by means of rotational force. The bearing bolts 37 of the brake shoes 36 are arranged at the planet carrier 30. Through tension springs 38, the brake shoes 36 are connected to the central hollow braking shaft 32. The planet carrier 30 surrounds this braking shaft 32.

Figure 3:
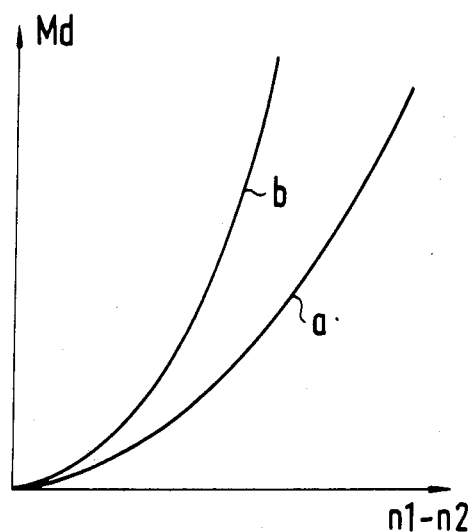
FIG. 3 is a graph of the characteristic lines of braking moment versus differential rotational speeds of the axles.

The braking moment $M_d$ introduced by the centrifugal brake at the planet carrier is plotted in FIG. 3 against the rotational difference $n1-n2$ between the rear axle 13 and the forward axle 1. As can be seen from FIG. 3, the braking moment $M_d$ rises exponentially with an increase in rotational speed difference. The curve "a" corresponds to counterclockwise rotation of the centrifugal brake 33, while the steeper curve "b" corresponds to clockwise rotation of the brake 33.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A limited slip differential system for the drive train of the front and rear axles of a motor vehicle with a continuous all-wheel drive, having an intermediate planetary transmission in the direct through drive and a corresponding braking device engageable with said intermediate planetary transmission in response to a rotational difference between the front and rear axles,
    wherein a transmission ratio between said braking device and said planetary transmission is substantially higher than a transmission ratio for said direct through drive,
    wherein said direct through drive comprises:
    an inlet sun gear;
    an outlet sun gear connected to an auxiliary axle to be driven, said outlet sun gear being adjacent, coaxial and having more teeth than said inlet sun gear;
    a planet gear wheel of a planet carrier, wherein said planet gear wheel is engageable with at least one of said sun gears and wherein rotational movement of said planet gear wheel is selectively braked by said braking device;
    wherein the through drive ratio of said planetary transmission from said front axle to said rear axle is inverse to the ratio of gear drive means of the front axle to gear drive means of the rear axle, such that said planetary carrier is stationary when said rotational speed difference of the front and rear axles is zero.

2. The system of claim 1, wherein said transmission ratio for said direct through drive is approximately 1:1.

3. The system of claim 1, wherein the ratio between said inlet sun gear to said planetary carrier is approximately 16:1.

4. The system of claim 1, wherein said braking device effects a progressively increasing braking moment dependent on said rotational speed difference between the front and rear axles.

5. The system of claim 1, wherein said braking device is a self-actuating brake.

6. The system of claim 5, wherein said brake is a mechanical friction brake.

7. The system of claim 5, wherein said brake is a hydrodynamic brake.

8. The system of claim 1, wherein said braking device is an externally guided brake.

9. The system of claim 8, wherein said brake is a hydraulically operted Lamella brake.

10. The system of claim 8, wherein said brake is an electrical eddy current brake.

11. The system of claim 1, wherein a braking member of said braking device exhibits different braking moment to rotational speed difference characteristics for opposite rotational directions of said drive train.

12. The system of claim 1, further including a transfer transmission in front of said planetary transmision.

13. The system of claim 12, wherein said transfer transmission is a planetary transmission.

14. The system of claim 12, wherein said transfer transmission is in driving connection with a driving motor of said vehicle, and the axle closest to said motor.

15. The system of claim 1, wherein at least one of said front axle gear drive means and said rear axle gear drive means is a bevel gear/plate gear drive.

16. The system of claim 1, wherein said braking device is a centrifugal brake.

* * * * *